(12) United States Patent
Pace

(10) Patent No.: US 7,421,353 B1
(45) Date of Patent: Sep. 2, 2008

(54) DIGITAL INTEGRATION METHOD

(75) Inventor: Benedict G. Pace, Shoreham, NY (US)

(73) Assignee: National Hybrid, Inc, Ronkonkoma, NY (US)

( * ) Notice: Subject to any disclaimer, the term of this patent is extended or adjusted under 35 U.S.C. 154(b) by 1112 days.

(21) Appl. No.: 10/718,169

(22) Filed: Nov. 20, 2003

Related U.S. Application Data

(60) Provisional application No. 60/427,854, filed on Nov. 20, 2002.

(51) Int. Cl.
 G06F 19/00 (2006.01)
 H02H 3/093 (2006.01)
(52) U.S. Cl. .................. 702/64; 700/293; 361/93.9
(58) Field of Classification Search ............ 702/64, 702/65; 361/79, 87, 93.9; 700/292, 293; 323/274, 275, 276, 277
See application file for complete search history.

(56) References Cited

U.S. PATENT DOCUMENTS

| 4,445,183 | A | | 4/1984 | McCollum et al. |
| 4,722,059 | A | * | 1/1988 | Engel et al. ............... 700/293 |
| 5,195,012 | A | | 3/1993 | Tripodi |
| 5,987,393 | A | * | 11/1999 | Stinson .................. 702/64 |
| 7,064,532 | B1 | * | 6/2006 | Suzuki .................. 323/276 |

* cited by examiner

Primary Examiner—Jessica Han
(74) Attorney, Agent, or Firm—John F McCormack

(57) ABSTRACT

This invention is a simplified method of digitally monitoring energy in a system. The power is measured at fixed periods, and the measurements summed in a register or accumulator. When the sum in the register or accumulator is equal to a specified energy divided by the fixed sample period a signal is generated.

In power controllers or solid state power controllers (SSPC), this algorithm is used to the maximum energy load ($I^2 t$). In a solid state switch, this algorithm is used to monitor the energy in a switch and generate a signal when the exceeds a specified safe operating limit.

21 Claims, 2 Drawing Sheets

DIGITAL INTEGRATION METHOD

This application claims the benefit of Provisional Application No. 60/427,854 filed Nov. 20, 2002.

FIELD OF THE INVENTION

This invention is related to the protection of electrical systems; it is also related to power controllers.

BACKGROUND OF THE INVENTION

Current passing through a conductor generates heat due to $I^2R$ power dissipation. The current-carrying capacity of a conductor is the maximum current which can be carried continuously, under specified conditions, without causing objectionable degradation of the insulating or electrical properties. At the rated, current-carrying capacity, the heat is dissipated harmlessly from the conductor to the environment. The temperature in a conductor, such as those on a printed wiring board or in a wire harness, rises due to $I^2R$ heating. Above the current-carrying capacity the $I^2R$ heat can exceed the temperature rating of the insulation. For a wire with a known resistance, the temperature rise is proportional to the integral of $I^2$ with respect to t, $\int I^2 dt$.

Manufacturers of wire harnesses and airframe manufacturers specify the maximum allowable value of this integral so that any current overload in the wire harness will be limited. An $I^2t$ Trip Time vs. Percent Current-Carrying Capacity curve has been published in Mil Standard 1760. A major airframe manufacturer also has published an $I^2t$ Trip Time vs. Percent Current-Carrying Capacity curve suitable for their aircraft applications. This plot has been widely copied, and is a de facto industry standard. FIG. 1 is a typical representation of this $I^2t$ Trip Time vs. Percent Current-Carrying Capacity. These $I^2T$ curves are essentially constant energy plots, i.e., plots of the maximum allowable energy, on axes of time and current squared, where the resistance has been normalized to one.

Mechanical circuit breakers have been used to protect wires from overheating by abnormally high currents. Turning on a circuit breaker into a capacitive load results in high in-rush currents that may be more than 10 times the rated current-carrying capacity. Conversely turning off highly inductive loads results in a large voltage, or inductive kick, which may exceed, the voltage rating of the wire insulation. Contact erosion, caused by arcing in these load types, limits circuit breaker life and produces severe EMI (electromagnetic interference) problems.

Since mechanical circuit breakers do not lend themselves well to computer control, solid state power controllers, SSPCs, are used. SSPCs eliminate contact arcing, reduce the peak in-rush current into capacitive loads and reduce the EMI. All circuit breakers have a rated current capacity and an associated "trip time", which is the time to "trip" or break the circuit at a specified overload condition. SSPCs more accurately monitor the power density in the conductor, allowing tighter control of the trip time.

In analog control of an SSPC, the square of the load current is integrated in an operational amplifier. The output of the operational amplifier (i.e., the energy) is applied to a comparator. The reference of the comparator represents the maximum allowable energy that may be applied to the load (e.g. a wire). When the maximum energy supplied exceeds this reference, the load is disconnected from the line. This analog circuitry is complex and prone to inaccuracy. This is especially true when the circuits are operating at a slight overload above their rated, current-carrying capacity. It is common practice to accommodate these errors by derating the current-carrying capacity.

McCollum et al., U.S. Pat. No. 4,445,183 describe a control means wherein an alternating current is sampled in intervals dictated by the frequency of the current. A squared digital current amplitude signal, corresponding to the sample, is added to an accumulator and a first predetermined constant is subtracted from the accumulator after each addition of the sampled squared digital current amplitude signal. The value in the accumulator is compared with a second predetermined constant, and the control means provides a trip signal in response to an accumulator value exceeding the second predetermined constant. Fifty and sixty hertz currents are sampled every 20 milliseconds and 16.7 milliseconds respectively. With the low sampling frequencies employed, the value in accumulator does not adequately represent the overload energy applied. Aircraft often use 400 hertz power, which would be sampled every 2.5 milliseconds. However, frequency control in aircraft is not accurate. Furthermore, the newer "dirty power" in aircraft runs directly off the engine and the frequency varies from well below 400 hertz up to as high as 800 hertz. With poor frequency control or "dirty power", in order determine the overload energy supplied it is necessary to measure the time interval between current samples and multiply the square of each current sample measurement by the appropriate time interval. In many applications current sampling intervals less than 1 millisecond are needed to accurately measure the overload currents.

Tripodi in U.S. Pat. No. 5,195,012 also discusses the use of sum of the square of the overload current to activate a trip signal. Tripodi introduces a second control function used after the sum of the squares of the overload current reaches a fixed value. This function is the sum of the squares of total current, and the trip signal is sent after this function reaches a predetermined maximum. To overcome problems associated with frequency variation Tripodi samples the current 4, 8 or 16 times, and averages the samples, the averaged samples thus represent time periods of 10, 20 or 40 milliseconds respectively.

The SSPC must not only protect the wire, but it must also protect its switching elements. When solid state switching elements are required to turn on into highly reactive loads, current limiting or foldback current limiting is used. In order to turn on in these modes, the power dissipated in the switching elements should be monitored. The manufacturers of solid state switching elements specify the maximum energy dissipation. To keep the device within this "safe operating area" (SOA) it is necessary to monitor the voltage across the switching element; multiply it by the current, and integrate the I·E product with respect to time, $\int (I \cdot E) dt$. The analog multiplying and integrating circuits used to measure this are complex. As a result the calculation is relatively inaccurate and will drift with temperature. This requires the "safe operating area" to be significantly "guard banded" or derated.

OBJECTS OF THE INVENTION

An object of this invention is to provide a digital method for monitoring the energy applied to an electrical load.

Another object of this invention to provide a digital method of power control. A further object of this invention is to provide simple, digital techniques for integrating the square of the current with respect to time. It is also an object of the invention to provide a power controller using such techniques.

An additional object of the invention is to provide digital methods to integrate electric current or voltage functions with respect to time. Among the digital methods are the integral of a current with respect to time, the integral of the square of a current with respect to time, and the integral of a voltage-current product with respect to time.

A further object of this invention is to provide a digital method for monitoring the energy in solid state switching devices, and to use this information to protect the switching devices.

SUMMARY OF THE INVENTION

The invention is a controller incorporating an algorithm capable of monitoring energy, J (joules), flowing into a system, and determining when a system reaches maximum allowable energy, $J_{max}$. The controller comprises a means for digitally monitoring the power, W (watts), at fixed, average time intervals, and, for each time interval, adding a digital number corresponding to the power into a register. The sum in the register at any time is the energy, the integral of power as a function time, $\int(Wdt)=J$. The controller transmits a trip signal, control signal or alarm signal when the sum in the register reaches a predetermined maximum allowable energy level.

One embodiment of the invention is solid state power controller (SSPC) selected from a group consisting of Programmable Array Logic (PAL), Programmable Logic Devices (PLD), Field Programmable Gate Arrays (FPGA) and Application Specific Integrated Circuts (ASIC). The SSPC according to this invention is capable of digitally monitoring a current, I, at fixed, average intervals, $\Delta t$; obtaining the square of the current, $I^2$; subtracting the square of the rated, current-carrying capacity, $I_O^2$; summing the values of $I^2 - I_O^2$ in a register; comparing the sum in the register to a control constant, $K_t$, where $K_t$ is equal to the rectilinear hyperbola constant, K, of the $I^2t$ vs Percent Rated Current curve, divided by the fixed average interval, $K_t = K/\Delta t$, and sending a control or trip signal when the value in the register equals or exceeds the control constant, $K_t$.

In another aspect the invention comprises a solid state power controller capable of controlling the safe operating area, (SOA), of solid state switching devices. The control algorithm comprising: measuring the voltage, E, and current, I, at a fixed average interval, $\Delta t$; Comparing the voltage to a predetermined, threshold voltage for the switching element, $E_t$. Determining the product of the current times the voltage difference, $I \cdot (E - E_t)$, for each average, fixed interval. And adding the $I \cdot (E - E_t)$ product to a register. Comparing the sum in the register to a control constant, $C_t$, and sending a signal when the sum in the register exceeds the control constant, $C_t$. The control constant is determined by dividing the rated, safe operating area of the switching element, $\int(I \cdot (E - E_t))dt$, by the average, fixed interval, $\Delta t$, $$C_t = \int(I \cdot (E - E_t))dt / \Delta t$$

DETAILED DESCRIPTION OF THE INVENTION

Switching devices turn off a system under a defined energy overload. The system includes the conductors, the load, the power source and the switching device itself. The switching devices may be electromechanical switching devices, electron tubes switching devices and solid state switching devices. Solid state switches having one or more solid state switching elements or devices include, but are not limited to, integrated gate bipolar transistors (IGBTs), power transistors, thyristors, and metal oxide semiconductor field effect transistors (MOSFETs). A preferred switching device according to this invention is a self-protected solid state switch.

The power dissipated by the current in a conductor is $I^2R$. The temperature rise in the insulation of the conductor is dependent on the power dissipated and the time.

Figure 1:
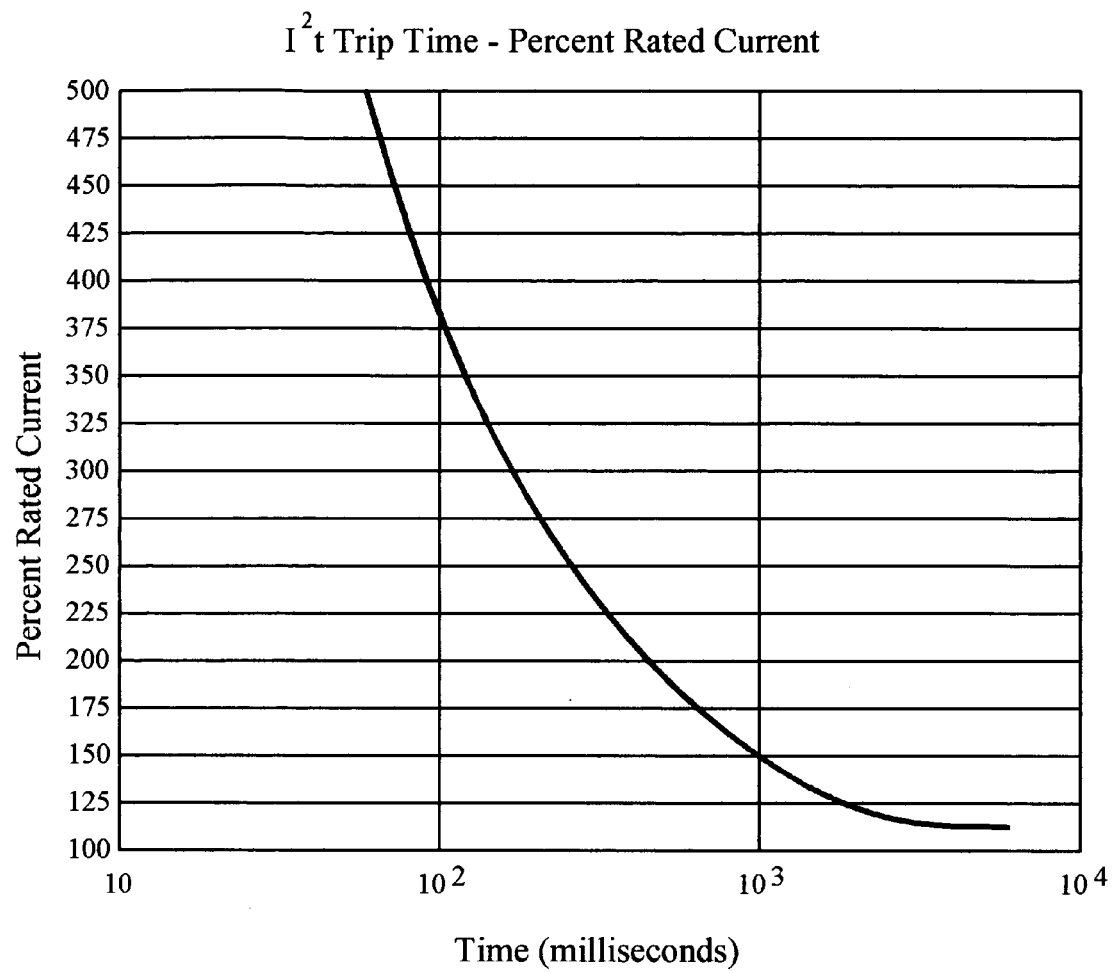
FIG. 1 is a typical $I^2$ vs. t chart as provided by an airframe manufacturer.

Assuming the resistance of the conductor is constant, the energy dissipated in the conductor is proportional to the current, $c \int I^2 dt$. The general equation of a rectilinear hyperbola is $xy=k$. The curve of the $I^2t$ Trip Time vs Percent Rated Current, as shown in FIG. 1, is a rectilinear hyperbola, $(I^2 - I_O^2)t=K$. The range of safe operation in accordance with an $I^2t$ vs. Percent Rated Current curve is contained in the area underneath the curve where the power is between zero and K, $$0 \leq \sum_0^N (I_N^2 - I_O^2) \Delta t < K$$

Here $\Delta t$=sampling interval; $I_O$=the rated, current-carrying capacity of the conductor; $I_N$=the current at time sample interval N, and K=the rectilinear hyperbola constant of the $I^2t$ vs Percent Rated Current curve.

In this invention the overload current is measured between the limits of $I_\infty$ the rated, current-carrying capacity, up to maximum a energy when $\int(I^2 - I_O^2)dt = K$. The current, ac or dc, is sampled at fixed intervals and converted to a digital number. The value of the overload $(I^2 - I_O^2)$ is summed in a register from the instant the current exceeds the rated, current-carrying capacity. Since the sampling interval, $\Delta t$, is held constant the operating range for safe operation in accordance with an $I^2t$ vs. Percent Rated Current curve is $$0 \leq \sum_0^N (I_N^2 - I_O^2) < K_t,$$

where the constant K of the rectilinear hyperbola is divided by the constant sampling interval, $\Delta t$, to form the constant $K_t = K/\Delta t$. The average, fixed, sampling interval, $\Delta t$, is held constant, and by holding it constant effectively takes $\Delta t$ out of the time dependent function, energy=watt*seconds, converting the quadratic, rectilinear hyperbolic function, $\int(I^2 - I_O^2)dt = K$, to a simple linear function, $\Sigma(I^2 - I_O^2) = K_t$.

One embodiment of this invention is a digital power controller, which monitors the current, I, at fixed intervals. The fixed interval is selected for the required accuracy and range of over-current for the specific application, and can be varied as necessary. The fixed interval can be as small as 1 nanosecond or less or as large as required for a specific application. The shorter the sampling interval the more accurately the algorithm represents the actual physical conditions. For avionics the sampling interval is preferably below 10 milliseconds, more preferably below 1 microsecond, and most preferably below 500 microseconds. The difference, $\Delta(I^2)=(I^2-I_O^2)$, between the square of the current, $I^2$, and the square of the rated, current-carrying capacity, $I_O^2$, is added to a register, and the value in the register is compared to the control constant $K_t$.

For example, if the current exceeds the rated, current-carrying capacity, $(I-I_O)>0$, the value of $\Delta(I^2)$ is incremented in the register. If the current is below the current carrying-capacity, $(I-I_O)<0$, the value of $\Delta(I^2)$ becomes negative and decrements the register. Since the monitoring time interval is constant, and the resistance of the conductor is constant, the value in the register represents the total energy above the rated, capacity. Preferably this algorithm continues until the register reaches zero. However, the value of the register is not allowed to go below zero. The register may be initiated whenever the digital controller is operated; continuously summing the value $I^2-I_O^2$ in the register, or as an alternative any value of $I>I_O$ would signal to initiate the summation of $\Delta(I^2)$ in the register.

If the value in the register reaches the limit, $\Sigma(I^2-I_O^2)\geq K_t$, the digital controller will send a control command this command can be used to interrupt the current. In the case of a shut down, the value in the register represents energy in the form of excess heat. Preferably after interrupting the current, the $\Delta(I^2)$ decrements the register to preserve the residual value of the heat energy present. The value of the residual heat will reduce the system response time if the device is reset before the register reaches zero. Under such circumstances, the time for over-currents $\Delta(I^2)$ to reach $K_t$ would be reduced.

The digital control of the "safe operating area", SOA, or the specified limit for the maximum energy dissipation, C, for solid state switching devices is carried out by integrating the product of the current and the voltage in excess of a safe threshold voltage over time, $\int(I\cdot(E-E_t))dt \geq C$.

A safe threshold voltage is predetermined based on the characteristics of the solid state switching element. The safe threshold voltage of the switching elements is determined from the manufacturer's data sheet as the maximum voltage across the switch at a power controller's rated current. For example, in the case of a field effect transistor (FET) switch, the safe threshold voltage is based on the voltage due to the rated current of the power controller multiplied by the specified "on" resistance in the FET manufacturer's data sheet. Likewise, in the case of an integrated gate bipolar transistor (IGBT) switch, the safe threshold voltage is based on the saturation voltage specified by the IGBT manufacturer's data sheet at the rated current of the power controller. To obtain the safe threshold voltage, a safety margin may be added to the calculated voltage to prevent nuisance tripping.

In this embodiment of the invention, the voltage and the current are monitored at short fixed intervals. If the voltage across the switching element is over the safe, predetermined threshold, $E_t$, the product of the voltage times the current, $I\cdot(E-E_t)$, at each fixed interval is added to a register. When the product of the voltage times the current, $I\cdot(E-E_t)$, is below the safe, predetermined threshold, the product is subtracted from the register until the register reaches zero. The register is not allowed to go below zero. As stated above the short, fixed sampling interval, $\Delta t$, is held constant, and by holding it constant effectively takes $\Delta t$ out of the time dependent function, $$energy = current*volts*seconds,$$

reducing $\int(I\cdot E)dt=\Sigma(I\cdot E)\Delta t \geq C$ to $\Sigma(I\cdot E) \geq C_t$, where $C_t=C/\Delta t$.

This method of digital integration of the voltage-current product over time reduces the error present in prior art systems and reduces the derating of the switching element required in prior art systems.

A digital controller for the over-current, containing the algorithm $\Sigma(I^2-I_O^2)\geq K_t$, may be combined with a solid state switch and with the circuitry and algorithm for control of the maximum energy dissipation in a solid state switch, $\Sigma(I\cdot(E-E_t))\geq C_t$, in a single unit.

In one example of the digital control the current was sampled every 150 microseconds. An analog to digital converter provided a digital value for the current. To filter the current values, ten samples were averaged together. The value of the filtered current, I, was compared to the rated current-carrying capacity $I_O$. Once the current became greater than the rated current, $I>I_O$, then the difference of the squares, $\Delta(I^2)=I^2-I_O^2$, was added to the register. For every subsequent I value, $\Delta(I^2)$ was added to the register unless the register reached zero. Whenever the register reached the value representing the maximum over-energy rating, $\Sigma(\Delta(I^2))\geq K_t$, the current was interrupted. When the current fell below the rated, current-carrying capacity, the value of $\Delta(I^2)$ became negative, and the accumulated value in the register was decreased. The limit of the register was zero, and when the accumulated value reached zero, the register remained at zero, until the current next exceeded the rated current-carrying capacity $I>I_O$.

Figure 2:
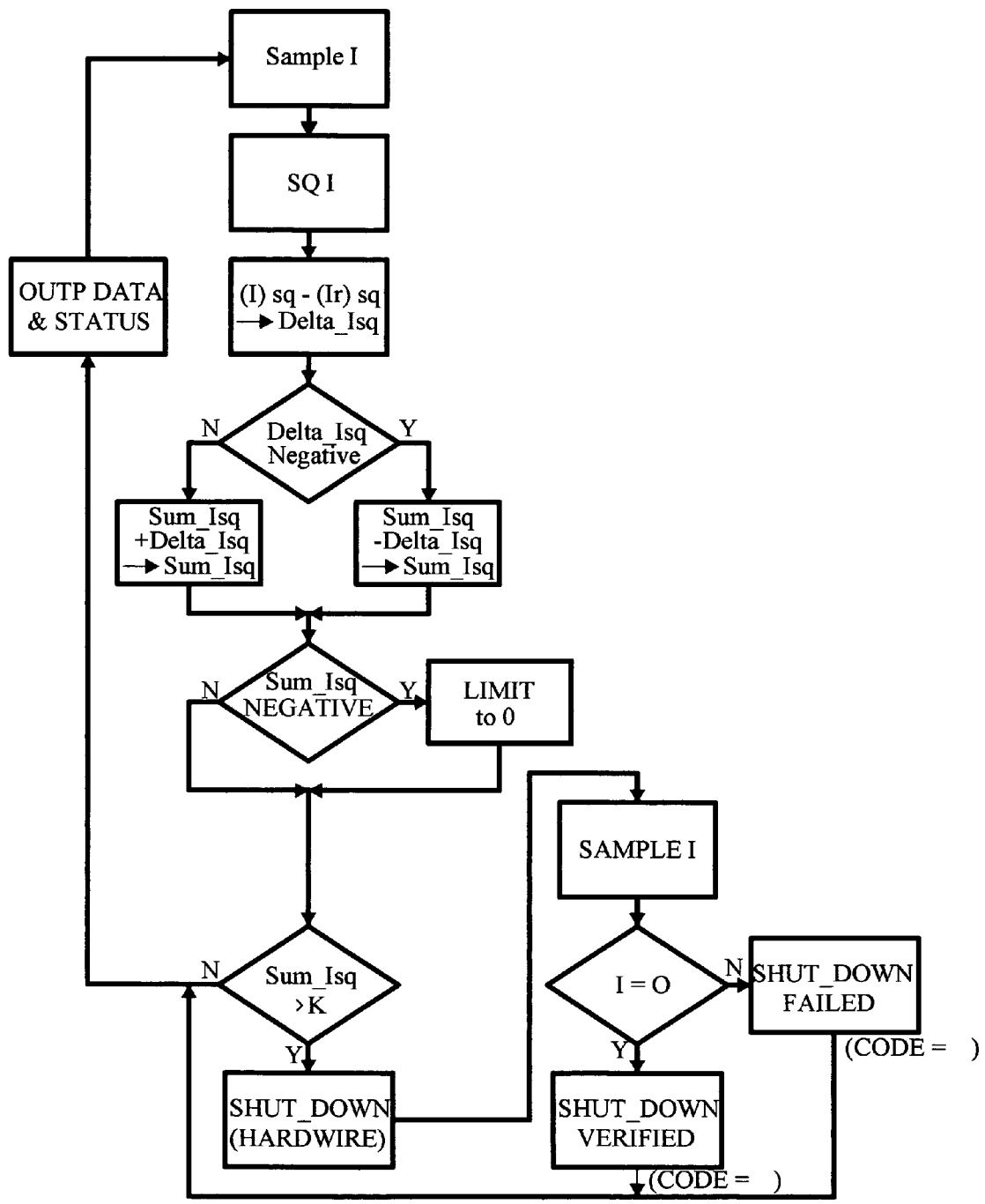
FIG. 2 is a flowchart of an $I^2t$ power controller according to this invention.

In another example, a 17 channel digital controller was used to control 16 loads. The 17th channel was used as a built-in-test (BIT) to confirm proper operation of the controller. Each of the 16 channels used a separate accumulator; each channel being controlled for its own value of $I_O$ (determined by input scaling). The currents were sampled with a multi-plexed analog-to-digital converter, controlled by the digital controller. The analog-to-digital converter provided digital signal values corresponding to the load currents. The control algorithm is illustrated in the flowchart, FIG. 2. As shown in the chart, the current, I, for each channel was sampled. The sampling interval for each channel was every 500 microseconds. The sampled current was squared and the square of the rated current-carrying capacity, $I_O^2$, was subtracted from the square of current, i.e., $\Delta(I^2)=I^2-I_O^2$. The value of each $\Delta(I^2)$ was summed in its register. When the sum, $\Sigma(\Delta(I^2))$, in any register reached zero or became negative, that register was reset to zero. When the value in any register equaled $K_t$, $\Sigma(\Delta(I^2))\geq K_t$, the digital control sent a trip signal, to shut down that load.

The digital control described above was successfully repeated sampling each channel at 100 microsecond intervals, and it was obvious that a 10 microsecond sampling interval could easily be implemented.

In the digital integration methods described for over-current control, most of the errors associated with the analog methods are eliminated. The "error budget" or the "guard band" is reduced. This permits specifying smaller wire. Wire size and weight are particularly sensitive in aircraft or spacecraft.

According to this invention a preferred solid state power controller would have: (1) digital control of $I^2t$, as described above, (2) a solid state switch, (3) digital control of the safe operating area, SOA, to protect the solid state switch, (4) instantaneous shutdown capability for severe current overload, (5) current limiting or foldback current limiting, (6) status reporting capability, and (7) suitable interfaces.

A digital power control may be implemented with a suitable input/output (I/O) interface in a Programmable Array Logic (PAL), a Programmable Logic Device (PLD), a Field Programmable Gate Array (FPGA) or an Application Specific Integrated Circuit (ASIC). The algorithm may also be performed in a Digital Signal Processor (DSP), a microcontroller or a microprocessor.

Variations and modifications of the method and apparatus for digital integration of current, voltage and power functions disclosed herein will be evident to those skilled in the art. One such variation would be to "dither" the current sampling interval, while maintaining a fixed average sampling interval. Another obvious variation would be to modify the constants based on the operating temperatures. It is intended that all such modifications and variations be included with the scope of the invention.

While the rectilinear hyperbola describes the typical $I^2t$ Trip Time curve as shown in FIG. 1, the digital summation algorithm of this invention can easily be modified to conform to atypical $I^2t$ Trip Time curves or any other function in time $$f(t)=\Sigma(at)\Delta t=at+c.$$

I claim:

1. A power controller capable of determining when a system reaches a maximum allowable energy, comprising means for:
   digitally monitoring a current, I, at fixed, average intervals, $\Delta t$;
   obtaining the square of the current, $I^2$;
   subtracting the square of the rated, current-carrying capacity of the system, $I_O^2$;
   summing the values of $(I^2-I_O^2)$ in a first register, the values in the first register always being greater than or equal to zero;
   comparing the sum in the first register to a first control value, $K_t$, where $K_t$ is equal to the rectilinear hyperbola constant, K, of a constant energy plot of percent rated current as a function of time, (FIG. 1), divided by the fixed average interval, $K_t=K/\Delta t$, and
   a means for sending a control signal when the value in the first register equals or exceeds the first control value, $K_t$.

2. A power controller according to claim 1, wherein the controller is implemented in a device selected from a group consisting of Programmable Array Logic (PAL), Programmable Logic Devices (PLD), Field Programmable Gate Arrays (FPGA) and Application Specific Integrated Circuits (ASIC).

3. A power controller according to claim 1, wherein the controller is implemented in a device selected from a group consisting of Digital Signal Processors (DSP), microcontrollers and microprocessors.

4. A power controller according to claim 1, further comprising means for instantaneous shutdown.

5. A power controller according to claim 1, further comprising means for current limiting.

6. A power controller according to claim 1, further comprising a means for foldback current limiting.

7. A solid state power controller according to claim 1, further comprising a means for monitoring energy in a solid state switch, and comparing it to a safe operating area, SOA, of the solid state switch, the solid state power controller comprising means for:
   measuring voltage across the solid switch, E, for each fixed average time interval, $\Delta t$;
   subtracting from the measured voltage, E, a predetermined, safe threshold voltage, $E_t$, $\Delta E=E-E_t$;
   determining the product of the current times the difference between the voltage and the safe threshold voltage, $I\cdot\Delta E$, for each fixed average time interval;
   summing the values of $I\cdot\Delta E$ in a second register; the values in the second register always being greater than or equal to zero;
   comparing the sum in the second register to a second control value, $C_t$, said second value representing the safe operating limit of the solid state switch, $\int((E-E_t)I)dt$, divided by the fixed average interval, $\Delta t$, $C_t=(\cdot((E-E_t)I)dt)/\Delta t$, and
   sending a control signal when the sum in the second register equals or exceeds the second value, $C_t$.

8. A solid state power controller according to claim 7, further comprising means for instantaneous shutdown.

9. A solid state power controller according to claim 7, further comprising means for current limiting.

10. A solid state power controller according to claim 7, further comprising a means for foldback current limiting.

11. A solid state power controller according to claim 7, wherein the controller is implemented in a device selected from a group consisting of Programmable Array Logic (PAL), Programmable Logic Devices (PLD), Field Programmable Gate Arrays (FPGA) and Application Specific Integrated Circuits (ASIC).

12. A solid state power controller according to claim 7, wherein the controller is implemented in a device selected from a group consisting of Digital Signal Processors (DSP), microcontrollers and microprocessors.

13. A controller for monitoring the energy in a solid state switch, and comparing it to a safe operating area, SOA, of the solid state switch, comprising means for:
   measuring the voltage across the solid state switch, E, and the current flowing through the solid state switch, I, at fixed average time intervals, $\Delta t$;
   subtracting from the measured voltage, E, a predetermined, safe threshold voltage, $E_t$, obtaining the difference, $\Delta E=E-E_t$;
   determining the product of the current times the difference, $I\cdot\Delta E$, for each fixed average time interval;
   summing the values of $I\cdot\Delta E$ in a register; the values in the register always being greater than or equal to zero;
   comparing the sum in the second register to a value, $C_t$, said value representing the safe operating limit of the solid state switch, $\int((E-E_t)I)dt$, divided by the fixed average time interval, $\Delta t$, $C_t=(\int((E-E_t)I)dt)/\Delta t$, and
   sending a control signal when the sum in the second register exceeds the control value, $C_t$.

14. A solid state power controller according to claim 13, further comprising means for instantaneous shutdown.

15. A solid state power controller according to claim 13, further comprising means for current limiting.

16. A solid state power controller according to claim 13, further comprising a means for foldback current limiting.

17. A solid state power controller according to claim 13, wherein the controller is implemented in a device selected from a group consisting of Programmable Array Logic (PAL), Programmable Logic Devices (PLD), Field Programmable Gate Arrays (FPGA) and Application Specific Integrated Circuits (ASIC).

18. A solid state power controller according to claim 13, wherein the controller is implemented in a device selected from a group consisting of Digital Signal Processors (DSP), microcontrollers and microprocessors.

19. In a controller having an algorithm for an $I^2t$ overload trip function wherein the algorithm creates a signal when the integral with respect to time of the square of the current ($I^2$) minus the square of the rated current ($I_O^2$) reaches an $I^2t$ overload value, $\int(I^2-I_O^2)dt=K$, the simplified algorithm characterized by:

digitally sampling the current at fixed intervals, $\Delta t$; summing the square of the sampled current minus the square of the rated current in a first register, the register never being allowed to go below zero, and creating a signal when the sum in the first register is equal or greater than the overload value divided by the current sampling interval, $K/\Delta t$.

20. A controller according to claim 19, further comprising a simplified algorithm for monitoring the energy in a solid state switch and comparing the energy to a safe operating area of a solid state switch characterized by:

digitally sampling the voltage across the solid state switch at the fixed time interval; subtracting a digital value of a predetermined safe, threshold voltage from the sampled voltage; multiplying the voltage difference and sampled current together; summing the products of the multiplications in a second register, the second register never being allowed to go below zero, and when the sum in the second register reaches a predetermined safe operating area limit, generating a control signal.

21. A controller comprising a simplified algorithm for monitoring the energy in a solid state switch and comparing it to a safe operating area of a solid state switch characterized by:

digitally sampling the voltage across the solid state switch at a fixed time interval; subtracting a digital value for a predetermined safe, threshold voltage from the sampled voltage; multiplying the sampled current and voltage difference together; summing the products of the multiplications in a register, the register never being allowed to go below zero, and when the sum in the register reaches the predetermined safe operating area limit, generating a control signal.

* * * * *